United States Patent
Ji et al.

(10) Patent No.: US 11,321,853 B2
(45) Date of Patent: May 3, 2022

(54) SELF-SUPERVISED VISUAL ODOMETRY FRAMEWORK USING LONG-TERM MODELING AND INCREMENTAL LEARNING

(71) Applicant: NEC Laboratories America, Inc., Princeton, NJ (US)

(72) Inventors: Pan Ji, San Jose, CA (US); Quoc-Huy Tran, Santa Clara, CA (US); Manmohan Chandraker, Santa Clara, CA (US); Yuliang Zou, Blacksburg, VA (US)

(73) Assignee: NEC Corporation

( * ) Notice: Subject to any disclaimer, the term of this patent is extended or adjusted under 35 U.S.C. 154(b) by 123 days.

(21) Appl. No.: 16/939,604

(22) Filed: Jul. 27, 2020

(65) Prior Publication Data

US 2021/0042937 A1 Feb. 11, 2021

Related U.S. Application Data

(60) Provisional application No. 62/935,106, filed on Nov. 14, 2019, provisional application No. 62/884,328, filed on Aug. 8, 2019.

(51) Int. Cl.
| | | |
|---|---|---|
| *G06T 7/00* | (2017.01) | |
| *G06T 7/246* | (2017.01) | |
| *G06T 7/579* | (2017.01) | |

(52) U.S. Cl.
CPC .............. *G06T 7/251* (2017.01); *G06T 7/579* (2017.01); *G06T 2207/10016* (2013.01); *G06T 2207/20081* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2018/0260951 A1* | 9/2018 | Yang | G06K 9/00718 |
| 2019/0079533 A1* | 3/2019 | Zhu | G06N 3/08 |
| 2019/0079534 A1* | 3/2019 | Zhu | G06K 9/6256 |
| 2019/0080470 A1* | 3/2019 | Zhu | G05D 1/0253 |
| 2020/0090359 A1* | 3/2020 | Pillai | G06N 3/0454 |

(Continued)

OTHER PUBLICATIONS

Tinghui Zhou et al., "Unsupervised Learning of Depth and Ego-Motion From Video", Proceedings of the IEEE Conference on Computer Vision and Pattern Recognition (CVPR), Jul. 2017, pp. 1851-1858.

(Continued)

*Primary Examiner* — Delomia L Gilliard
(74) *Attorney, Agent, or Firm* — Joseph Kolodka

(57) ABSTRACT

A computer-implemented method for implementing a self-supervised visual odometry framework using long-term modeling includes, within a pose network of the self-supervised visual odometry framework including a plurality of pose encoders, a convolution long short-term memory (ConvLSTM) module having a first-layer ConvLSTM and a second-layer ConvLSTM, and a pose prediction layer, performing a first stage of training over a first image sequence using photometric loss, depth smoothness loss and pose cycle consistency loss, and performing a second stage of training to finetune the second-layer ConvLSTM over a second image sequence longer than the first image sequence.

20 Claims, 6 Drawing Sheets

(56) References Cited

U.S. PATENT DOCUMENTS

| | | | | |
|---|---|---|---|---|
| 2020/0160065 | A1* | 5/2020 | Weinzaepfel | G06N 3/08 |
| 2020/0211206 | A1* | 7/2020 | Wang | G06N 20/00 |
| 2020/0380720 | A1* | 12/2020 | Dixit | G06T 7/74 |
| 2021/0004976 | A1* | 1/2021 | Guizilini | G06K 9/00201 |
| 2021/0049371 | A1* | 2/2021 | Gu | G06N 3/084 |
| 2021/0118184 | A1* | 4/2021 | Pillai | G06T 7/50 |
| 2021/0213973 | A1* | 7/2021 | Carillo | G06T 7/70 |

OTHER PUBLICATIONS

Zhenheng Yang et al., "Unsupervised Learning of Geometry from Videos with Edge-Aware Depth-Normal Consistency", The Thirty-Second AAAI Conference on Artificial Intelligence (AAAI-18), Apr. 2018, pp. 7493-7500.

Chaoyang Wang et al., "Learning Depth from Monocular Videos using Direct Methods", Proceedings of the IEEE Conference on Computer Vision and Pattern Recognition (CVPR), Jun. 2018, pp. 2022-2030.

Reza Mahjourian et al., "Unsupervised Learning of Depth and Ego-Motion From Monocular Video Using 3D Geometric Constraints", Proceedings of the IEEE Conference on Computer Vision and Pattern Recognition (CVPR), Jun. 2018, pp. 5667-5675.

Fei Xue et al., "Beyond Tracking: Selecting Memory and Refining Poses for Deep Visual Odometry", Proceedings of the IEEE/CVF Conference on Computer Vision and Pattern Recognition (CVPR), Jun. 2019, pp. 8575-8583.

* cited by examiner

SELF-SUPERVISED VISUAL ODOMETRY FRAMEWORK USING LONG-TERM MODELING AND INCREMENTAL LEARNING

RELATED APPLICATION INFORMATION

This application claims priority to provisional application Ser. No. 62/884,328, filed on Aug. 8, 2019, and 62/935,106, filed on Nov. 14, 2019, incorporated herein by reference herein in their entirety.

BACKGROUND

Technical Field

The present invention relates to artificial intelligence and machine learning, and more particularly to self-supervised visual odometry frameworks using long-term modeling and incremental learning.

Description of the Related Art

Visual odometry is generally concerned with incrementally estimating ego-motion using visual input (e.g., three-dimensional (3D) motion of an agent equipped with one or more cameras or other imaging device within an environment). Visual odometry techniques can be useful for many applications such as, e.g., autonomous driving, robot navigation, and virtual or augmented reality. Similar to visual odometry, structure-from-motion (SfM) aims to estimate the 3D scene structures and ego-motions based on two-dimensional (2D) image sequences.

SUMMARY

According to an aspect of the present invention, a computer-implemented method for implementing a self-supervised visual odometry framework using long-term modeling is provided. The method includes, within a pose network of the self-supervised visual odometry framework including a plurality of pose encoders, a convolution long short-term memory (ConvLSTM) module having a first-layer ConvLSTM and a second-layer ConvLSTM, and a pose prediction layer, performing a first stage of training over a first image sequence using photometric loss, depth smoothness loss and pose cycle consistency loss, and performing a second stage of training over a second image sequence longer than the first image sequence to finetune the second-layer ConvLSTM. Performing the first stage of training includes generating, by each of a plurality of components of the first-layer ConvLSTM, a corresponding pose feature based on the first image sequence, receiving, by each component of the second layer ConvLSTM, a concatenation of the pose features and depth features of a first frame and a current frame, the depth features being generated by a depth network of the self-supervised visual odometry framework, and predicting, by the pose prediction layer, a relative pose and an absolute pose based on the concatenation of the pose features and the depth features.

According to another aspect of the present invention, a system for implementing a self-supervised visual odometry framework using long-term modeling is provided. The system includes a memory device storing program code, and at least one processor device operatively coupled to the memory device. The at least one processor device is configured to execute program code stored on the memory device to, within a pose network of the self-supervised visual odometry framework including a plurality of pose encoders, a convolution long short-term memory (ConvLSTM) module having a first-layer ConvLSTM and a second-layer ConvLSTM, and a pose prediction layer, perform a first stage of training over a first image sequence using photometric loss, depth smoothness loss and pose cycle consistency loss, and perform a second stage of training over a second image sequence longer than the first image sequence to finetune the second-layer ConvLSTM. The first stage is training is performed by generating, by each of a plurality of components of the first-layer ConvLSTM, a corresponding pose feature based on the first image sequence, receiving, by each component of the second layer ConvLSTM, a concatenation of the pose features and depth features of a first frame and a current frame, the depth features being generated by a depth network of the self-supervised visual odometry framework, and predicting, by the pose prediction layer, a relative pose and an absolute pose based on the concatenation of the pose features and the depth features.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
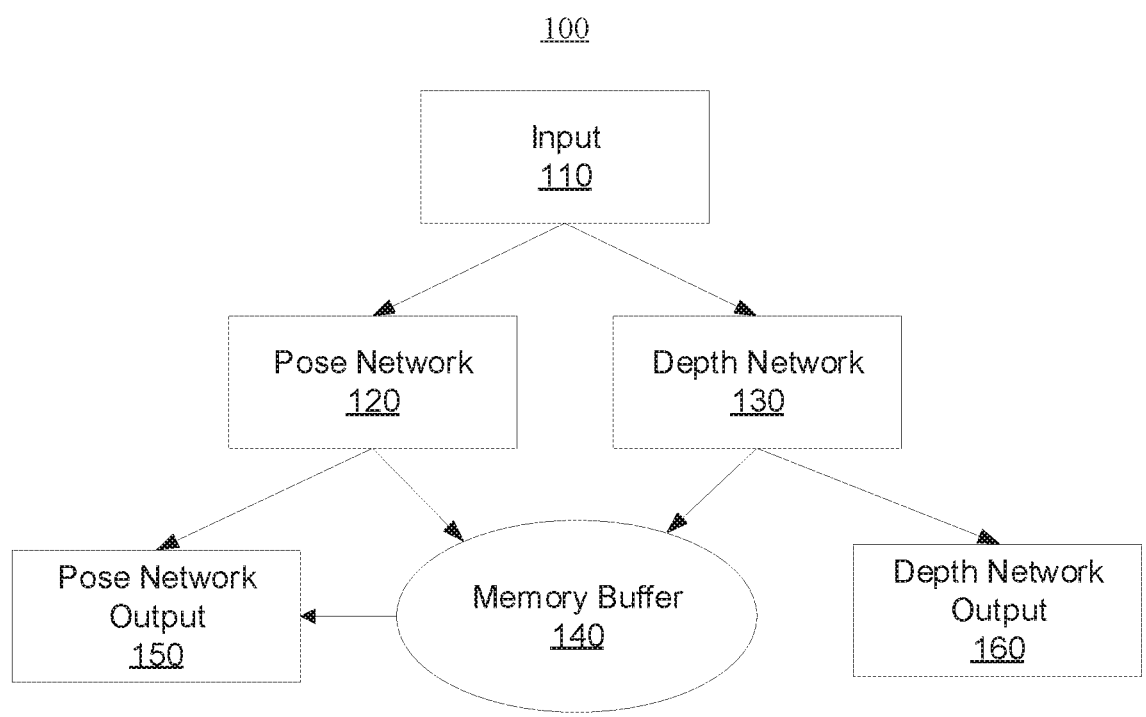
FIG. 1 is a block/flow diagram illustrating a high-level self-supervised visual odometry learning framework using long-term modeling, in accordance with an embodiment of the present invention.

In accordance with embodiments of the present invention, systems and methods are provided to implement a self-supervised visual odometry framework using long-term modeling. More specifically, the visual odometry learning framework can include a self-supervised structure-from-motion (SfM) framework with consideration for long sequence consistency that models long-term temporal dependency. To achieve this, the self-supervised visual odometry framework described herein combines features from both geometric visual odometry frameworks and self-supervised visual odometry frameworks. In other words, the visual odometry framework described herein is a self-supervised visual odometry framework that includes features designed to emulate or mimic modules within geometry-based visual odometry frameworks. The embodiments described herein can learn from "truly" long sequences (e.g., about 100 frames) in the training stage and, by considering long-term modeling, can give rise to empirical benefits.

To allow the network described herein to see beyond short snippets (e.g., 3 or 5 frames) during training time, the embodiments described herein provide for a two-stage training strategy. In the first stage, short snippets (e.g., about 7 frames) are used as input and, in the second stage, longer sub-sequences (e.g., about 100 frames) are used as input. The second ConvLSTM layer is fine-tuned with features from a large temporal window to optimize poses via long-term modeling (similar to a bundle adjustment module found in geometric visual odometry frameworks). The term "pose" as used herein refers to the position and orientation of an object. This two-stage training strategy allows the network to "see beyond" the snippets during training time.

The embodiments described herein can address the scale drift problem of self-supervised visual odometry frameworks, which results from a failure of pose networks of self-supervised visual odometry frameworks to estimate ego-motion with a consistent scale, by regressing temporally consistent depths and camera poses from monocular and/or stereo image sequences. The self-supervised visual odometry framework described herein can rely on photometric error minimization across neighboring frames, instead of training networks in a supervised way with potentially labor-extensive and time-consuming ground truth depths and motions. Accordingly, the embodiments described herein attempt to close the gap between self-supervised and geometric visual odometry frameworks.

To enable deployment to unseen environments, the embodiments described herein can further provide an unsupervised incremental learning strategy that allows the model to quickly adapt to the new domain while not catastrophically forgetting what the model has learnt in the previous domains. For example, during unsupervised incremental learning, first convolutional layers can be fixed and the last few layers may be fine-tuned, a fixed number of short representative sequences from old domains can be stored, and the network with samples from both the old and current domains can be fine-tuned. The network described herein can be trained end-to-end in a self-supervised manner using, e.g., photometric loss and depth smoothness loss.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Referring now in detail to the figures in which like numerals represent the same or similar elements and initially to FIG. 1, a high-level self-supervised visual odometry framework (e.g., system/method) 100 is illustratively depicted in accordance with one embodiment of the present invention. For example, the framework 100 can implement self-supervised structure-from-motion (SfM) learning that includes features to emulate or mimic modules within geometric visual odometry frameworks. The framework 100 can be trained using photometric loss, depth smoothness loss, and pose cycle consistency loss, as will be described in further detail below.

As shown, an input 110 is received by a pose network 120 and a depth network 130. More specifically, the input 110 can include a plurality of image sequences.

The pose network 120 takes a concatenation of two consecutive frames as input to estimate ego-motion. For example, six degree of freedom (6-DoF) ego-motion can be estimated. The pose network 120 can regress camera relative poses and absolute poses in a current snippet. The depth network 130 takes a single (RGB) image as input to predict a depth map and can use an autoencoder structure to regress per-pixel depth.

More specifically, the self-supervised visual odometry framework described herein can include a recurrent pose network architecture in which the pose network 120 includes pose encoders (e.g., of a FlowNet backbone), a convolution long short-term memory (ConvLSTM) module including first-layer and second-layer ConvLSTMs utilized at the end of the pose network to model long-term dependency in the pose estimation, and two pose prediction heads (with one after each of the ConvLSTM layers). In the two-layer recurrent architecture, the first-layer ConvLSTM focuses on predicting consecutive frame motions, while the second-layer ConvLSTM refines estimations from the first-layer ConvLSTM. The ConvLSTM module encodes temporal smoothness and consistency in terms of poses and image depths. The pose network 120 can further include a memory module can be provided to store both the pose and depth features of previous frames, and to feed the pose and depth features of the previous frames into the second ConvLSTM layer to model long-term dependencies. Hidden states of the first-layer ConvLSTM can be stored in a fixed-sized memory buffer to facilitate long-term dependency.

The pose encoders of the pose network 120 mimic keypoint tracking of geometric visual odometry methods to extract pair-wise image features, and the ConvLSTMs model the sequential nature of the visual odometry problem. The ConvLSTM module mimics keyframe insertion of geometric visual odometry methods in the sense that the second-layer ConvLSTM can predict the motions between keyframe and non-keyframe and refine the initial consecutive estimations from the first-layer ConvLSTM.

The depth network 130 can include a depth encoder and a depth decoder.

Further details regarding the components of the pose network 120 and the depth network 130 will be described below with reference to FIG. 2.

A (monocular) visual odometry task described herein can be formulated as a view synthesis problem by performing training to predict a target image from a source image with estimated depth and camera pose.

More specifically, given two input images $I_t$ and $I_{t+1}$, where $t \in [0, N]$, an estimated depth map $D_t$ and a camera pose $\hat{T}_{t \to (t+1)}$, a per-pixel correspondence between the two input images $I_t$ and $I_{t+1}$ can be computed. If $p_t$ represents a two-dimensional (2D) homogeneous coordinate of a pixel in $I_t$ and K corresponds to a known camera intrinsic matrix, the corresponding point of $p_t$ in $I_{t+1}$, $p_{t+1}$, can be found using the following relationship:

$$p_{t+1} \sim K\hat{T}_{t \to t+1} D_t(p_t) K^{-1} p_{(t)} \quad (1)$$

Regarding appearance loss, in a self-supervised visual odometry system such as that depicted in FIG. 1 and described herein, primary supervision comes from the appearance dissimilarity between the synthesis image and the target image. To effectively handle occlusion, three consecutive frames can be used to compute the per-pixel minimum photometric reprojection loss. For example:

$$L_A = \frac{1}{N-2} \sum_{t=1}^{N-2} \min_{t' \in [t-1, t+1]} \rho(I_t, \hat{I}_{t' \to t}) \quad (2)$$

where ρ is a weighted combination of the L2 loss and the structured similarity (SSIM) loss, $I_{t' \to t}$ denotes the frame synthesized from $I_{t'}$ using relationship (1). Static pixels can be handled by adopting any suitable auto-masking mechanism. The appearance loss in equation (2) corresponds to a local photometric bundle adjustment objective.

Since the appearance loss may not provide meaningful supervision for texture-less or homogeneous region of a scene, a smoothness prior of disparity can be incorporated. Edge-aware smoothness loss ($L_S$) can illustratively be used.

With the above setting, the pose network 120 adopts a recurrent structure to utilize temporal information. This enables the self-supervised visual odometry framework described herein to recover an entire trajectory in a consistent manner by taking sequential dependence and dynamics in long sequences into account (as opposed to estimating ego-motion within a local range while discarding the sequential dependence and dynamics).

Instead of taking the concatenation of two frames and outputting a camera pose directly, the incorporation of the ConvLSTM module including the first-layer and second-layer ConvLSTMs within the pose network 120 enables the pose network 120 to further take the previous estimation information into account when predicting the output camera pose. For example, the pose network 120 can implement the following relationships:

$$F_t = \text{PEnc}(I_t, I_{t-1}) \quad (3)$$

$$O_t, H_t = \text{ConvLSTM}(F_t, H_{t-1}) \quad (4)$$

$$\hat{T}_{t-1 \to t} = g_1(O_t) \quad (5)$$

where PEnc(•) is a pose encoder, $O_t, H_t$ denotes the output and hidden state of the ConvLSTM at time t, and $g_1(•)$ is a linear layer to predict the motion (e.g., 6-DoF motion) $T_{t-1 \to t}$. Accordingly, the network can implicitly learn to aggregate temporal information and the motion pattern.

In this sequential modeling setting, the pose network 120 can estimate the relative pose for every two consecutive frames. However, the motions between consecutive frames are often tiny, which can result in difficulties with respect to extracting good features for relative pose estimation. Thus, the camera pose can illustratively be predicted from a non-adjacent "anchor" frame to the current frame.

The ConvLSTM module described herein can explicitly model the sequential nature of the visual odometry problem and facilitate the implementation of a keyframe mechanism of geometric visual odometry frameworks. To emulate a keyframe mechanism, after each step in the first-layer ConvLSTM, a hidden state tensor can be stored in a corresponding memory buffer, having a length set to the length of the input image. The weighted average of all memory slots in the memory buffer can be computed during read out from the memory buffer. Additionally, depth and pose features for the first frame and the current frame can be computed as additional input to the second-layer ConvLSTM. This can be formally expressed by the following relationships:

$$E_t = DEnc(I_t) \quad (6)$$

$$F_{t,abs} = PEnc(I_0, I_t) \quad (7)$$

$$O_{t,abs}, H_{t,abs} = ConvLSTM(F_{t,abs}, E_0, E_t, M_t, H_{t-1,abs}) \quad (8)$$

$$\hat{T}_{0 \to t} = g_2(O_{t,abs}) \quad (9)$$

where $DEnc(\cdot)$ is the depth encoder, $M_t$ is the read-out memory, $O_{t,abs}, H_{t,abs}$ denotes the output and hidden state from the second-layer ConvLSTM at time t, and $g_2(\cdot)$ is a linear layer to predict the absolute pose in the current image. Accordingly, the memory module of the pose network 120 described herein accommodates both depth and pose features.

In accordance with the embodiments described herein, the first-layer ConvLSTM can estimate the relative pose between consecutive or adjacent frames to model smoothness between the consecutive frames, and the second-layer Conv LSTM can predict the absolute pose within the current input image (e.g., snippet) encoding global information.

Further details regarding relative and absolute poses are described below with reference to FIG. 3.

To train the second-layer ConvLSTM, photometric error between the first frame and the other frames of the input image (e.g., snippet) can be used. For example:

$$L_{A,abs} = \frac{1}{N-1} \sum_{t=1}^{N-1} \rho(I_0, \hat{I}_{t \to 0}) \quad (10)$$

where N is the number of frames for the input image. In one illustrative embodiment, N=7. Also, according to the transitivity of the camera transformation, an additional cycle-consistency constraint can be provided to ensure consistency between the first-layer ConvLSTM and the second-layer ConvLSTM. For example:

$$L_P = \frac{1}{N-1} \sum_{t=1}^{N-1} \left\| \hat{T}_{0 \to t} - \hat{T}_{t-1 \to t} \hat{T}_{0 \to t-1} \right\|_2^2. \quad (11)$$

The objective/loss in equation 11 can be thought of as a mini "loop closure" module that enforces cycle-consistency between the outputs of the two ConvLSTM layers. The framework described herein can be further designed to incorporate a mechanism to detect loops and perform full loop closure. The overall objective may be provided by the following relationship:

$$L_{full} = L_A + \lambda_1 L_S + L_{A,abs} + \lambda_2 L_P \quad (12)$$

where $\lambda_1$ and $\lambda_2$ are hyperparameters to balance the scale of different terms. For example, in one embodiment, $\lambda_1$ and $\lambda_2$ can be set to 0.001.

Limited memory volume of processing units (e.g., graphics processing units (GPUs)) has been a hurdle preventing the ability to take long sequences as input for training long-term models to learn how to fully utilize long-term temporal context. To tackle this long-term model training problem, the framework 100 is configured to implement a two-stage training strategy.

In the first stage, also referred to herein as "short-range training," a model is trained with the full objective/loss, $L_{full}$, using short snippet inputs. For example, in one embodiment, the input can include a 7-frame snippet. During this first stage, the depth encoder, the depth decoder, the pose encoder, the first-layer ConvLSTM and the second-layer ConvLSTM are trainable.

Once the first stage of training is finished, the second stage of training, also referred to herein as "long-range training" is performed. The second stage can be viewed as a motion-only bundle adjustment module (of a geometric visual odometry framework) that considers long-term modeling. During the second stage, a long sequence is provided as input. For example, in one embodiment, the input can include a 97-frame sequence. The model is run on each sequence in the dataset separately to extract and store the input for the second-layer ConvLSTM. Then, to save memory, only the lightweight second-layer ConvLSTM is fine-tuned without needing to rely on heavy feature extraction and depth networks. By doing this, long sequences can be provided as input during training time, allowing improved ability for learning how to utilize the temporal context. Since only the second-layer ConvLSTM needs to be optimized in the pose network 120, the objective/loss for the second stage of training, $L_{long}$, can be represented by the following relationship:

$$L_{long} = \frac{1}{M} \sum_{m=0}^{M-1} \frac{1}{N-1} \sum_{t=m(N-1)+1}^{(N-1)(m+1)} \rho(I_{m(N-1)}, \hat{I}_{t \to m(N-1)}) \quad (13)$$

where N is the number of frames of each input (e.g., 7) and M is the number of snippets in the input sequence (e.g., 16).

Figure 2:
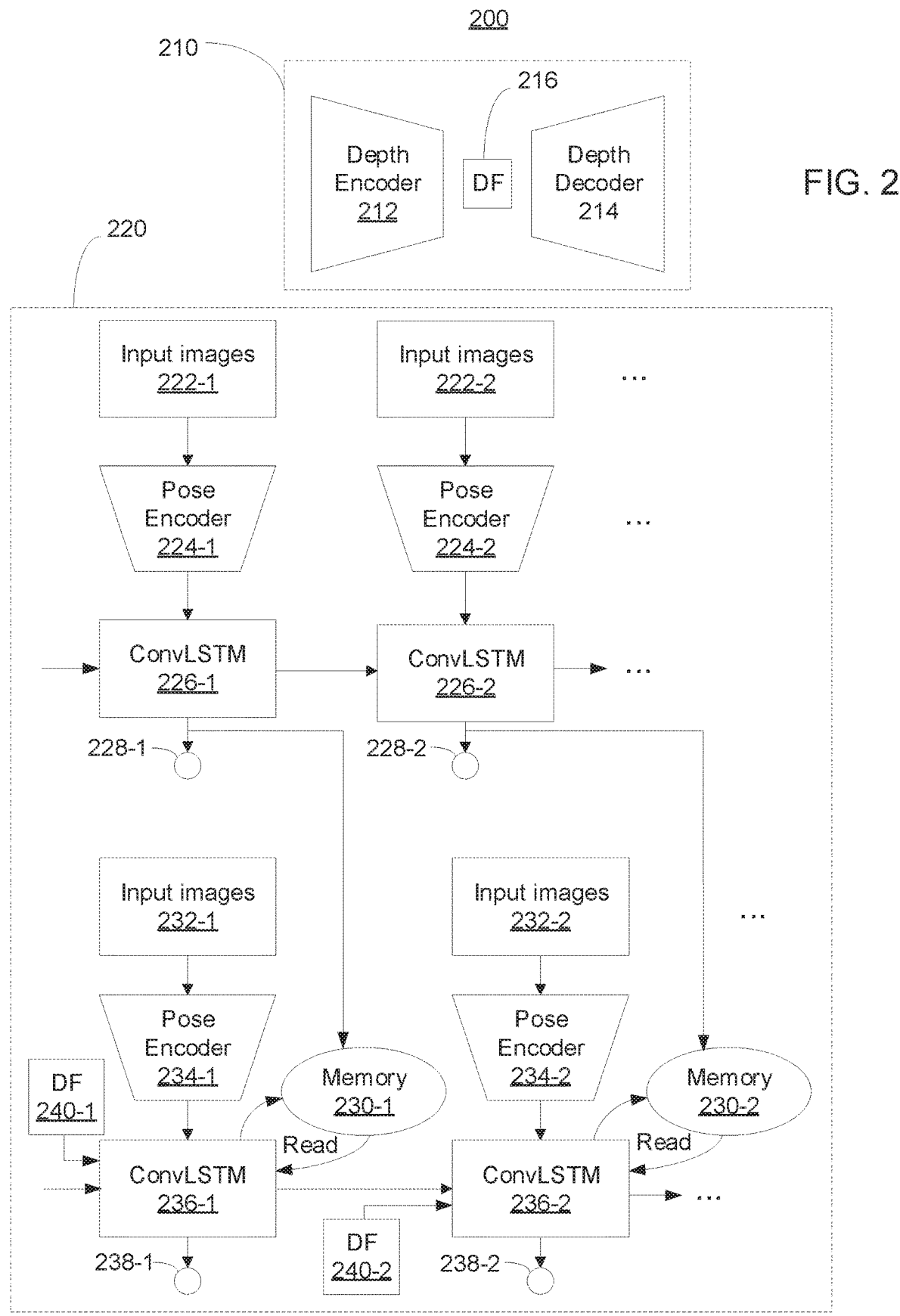
FIG. 2 is a block/flow diagram illustrating an example of the self-supervised visual odometry framework using long-term modeling of FIG. 1, in accordance with an embodiment of the present invention.

Referring now to FIG. 2, an exemplary visual odometry framework 200 is illustratively depicted in accordance with an embodiment of the present invention. The framework 200 can implement the functionality described above with reference to FIG. 1.

As shown, the network 200 includes a depth network 210 and a pose network 220. The depth network 210 takes an autoencoder structure to regress the per-pixel depth. For example, the depth network 210 includes a depth encoder 212, a depth decoder 214 and a depth feature (DF) 216.

As mentioned above with reference to FIG. 1, the pose network 220 adopts a recurrent structure to utilize temporal information. This enables the self-supervised visual odometry framework described herein to recover an entire trajectory in a consistent manner by taking sequential dependence and dynamics in long sequences into account (as opposed to estimating ego-motion within a local range while discarding the sequential dependence and dynamics).

In the pose network 220, a plurality of sets of input images including input images 222-1 and 222-2 are received by a plurality of respective pose encoders including pose encoders 224-1 and 224-2. For example, each set of input images can include a concatenated pair of input images $I_{t-1}$ and $I_t$, where t∈[0, N]. More specifically, input images 222-1 can include images $I_0$ and $I_1$, input images 222-2 can include images $I_1$ and $I_2$, etc.

The outputs of the pose encoders 224 are received by respective components of a first-layer convolution long short-term memory (ConvLSTM), including ConvLSTM components 226-1 and 226-2. Each subsequent ConvLSTM component can receive additional input from the preceding ConvLSTM component. For example, as shown in FIG. 2, the output of the ConvLSTM component 226-1 is received by the ConvLSTM component 226-2.

The first-layer ConvLSTM is configured to estimate relative camera poses between adjacent or neighboring frames. For example, as shown in FIG. 2, the ConvLSTM component 226-1 generates a camera pose 228-1 and the ConvLSTM component 226-2 generates a camera pose 228-2. More specifically, the camera pose 228-1 can correspond to $\hat{T}_{0 \to 1}$, the camera pose 228-2 can correspond to $\hat{T}_{1 \to 2}$, and more generally, the t-th camera pose generated by the t-th ConvLSTM component can correspond to $\hat{T}_{t-1 \to t}$. The outputs the first-layer ConvLSTM are stored in respective memories. For example, the output of the ConvLSTM component 226-1 is stored in memory 230-1 and the output of the ConvLSTM component 226-2 is stored in memory 230-2.

As further shown in the pose network 220, a plurality of sets of input images including input images 232-1 and 232-2 are received by a plurality of respective pose encoders including pose encoders 234-1 and 234-2. For example, each set of input images can include a concatenated pair of input images $I_0$ and $I_t$, where t∈[0, N]. More specifically, input images 232-1 can include images $I_0$ and $I_1$, input images 222-2 can include images $I_0$ and $I_2$, etc.

The outputs of the pose encoders 234 are received by respective components of a second-layer ConvLSTM, including ConvLSTM components 236-1 and 236-2. Each subsequent ConvLSTM component can receive additional input from the preceding ConvLSTM component. For example, as shown in FIG. 2, the output of the ConvLSTM component 226-1 is received by the ConvLSTM component 226-2. Furthermore, each component of the second-layer ConvLSTM can receive respective depth features (DFs). For example, ConvLSTM component 236-1 can receive DF 240-1, ConvLSTM component 236-2 can received DF 240-2, etc. The DFs received by the second-layer ConvLSTM can come from the bottleneck features of the depth autoencoder.

The second-layer ConvLSTM is configured to predict "absolute" camera poses. For example, as shown in FIG. 2, the ConvLSTM component 236-1 generates a camera pose 238-1 and the ConvLSTM component 226-2 generates a camera pose 228-2. More specifically, the camera pose 238-1 can correspond to $\hat{T}_{0 \to 1}$, the camera pose 238-2 can correspond to $\hat{T}_{0 \to 2}$, and more generally, the t-th camera pose generated by the t-th ConvLSTM component can correspond to $\hat{T}_{0 \to t}$. The outputs of the second-layer ConvLSTM are stored in respective memories. For example, the output of the ConvLSTM component 236-1 is stored in memory 230-1 and the output of the ConvLSTM component 236-2 is stored in memory 230-2.

During the first stage of training, the components of the depth network 210 (e.g., the depth encoder 212 and the depth decoder 214) and the components of the pose network 220 (e.g., the pose encoders 224, 234 and the first and second LSTM layers 226, 236) are jointly trained. During a second stage of training, depth features can be pre-extracted as input and the second LSTM components 236 can be fine-tuned.

Figure 3:
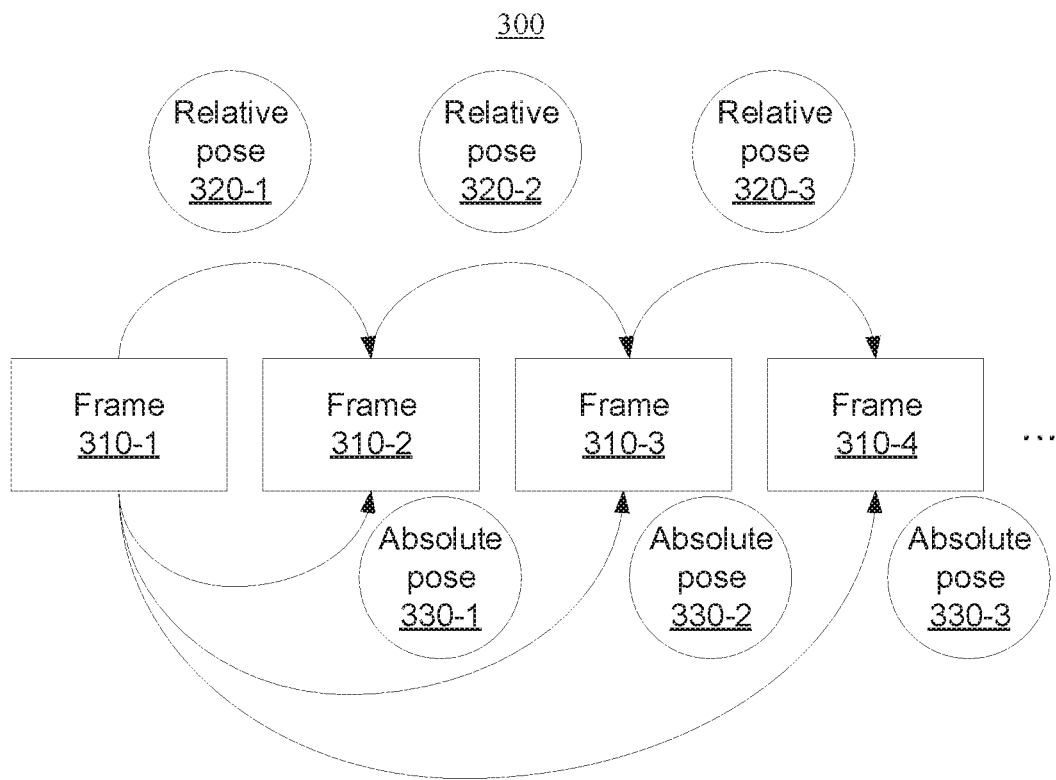
FIG. 3 is a diagram illustrating cycle consistency over two-layer poses, in accordance with an embodiment of the present invention.

Referring now to FIG. 3, a diagram 300 is provided illustrating cycle consistency over two-layer poses. As shown, the diagram 300 includes a plurality of frames including frames 310-1 through 310-4. For example, frame 310-1 can correspond to t=0, frame 310-2 can correspond to t=1, frame 310-3 can correspond to t=2, frame 310-4 can correspond to t=3, etc., where t is the time step.

As described herein above, the first-layer ConvLSTM estimates the relative pose between consecutive frames, and the second-layer ConvLSTM can predict the "absolute" pose within the current frame/snippet. As shown, the relative pose 320-1 ($\hat{T}_{0 \to 1}$) can be estimated between frames 310-1 and 310-2, the relative pose 320-2 ($\hat{T}_{1 \to 2}$) can be estimated between frames 310-2 and 310-3, the relative pose 320-3 ($\hat{T}_{2 \to 3}$) can be estimated between frames 310-3 and 310-4, etc. Moreover, the absolute pose 330-1 ($\hat{T}_{0 \to 1}$) can be predicted for frame 310-2, the absolute pose 330-2 ($\hat{T}_{0 \to 2}$) can be predicted for frame 310-3, and the absolute pose 330-3 ($\hat{T}_{0 \to 3}$) can be predicted for frame 310-4. By exploiting the transitivity of camera poses, a cycle consistency constraint can be provided between the first-layer and second-layer ConvLSTMs.

Figure 4:
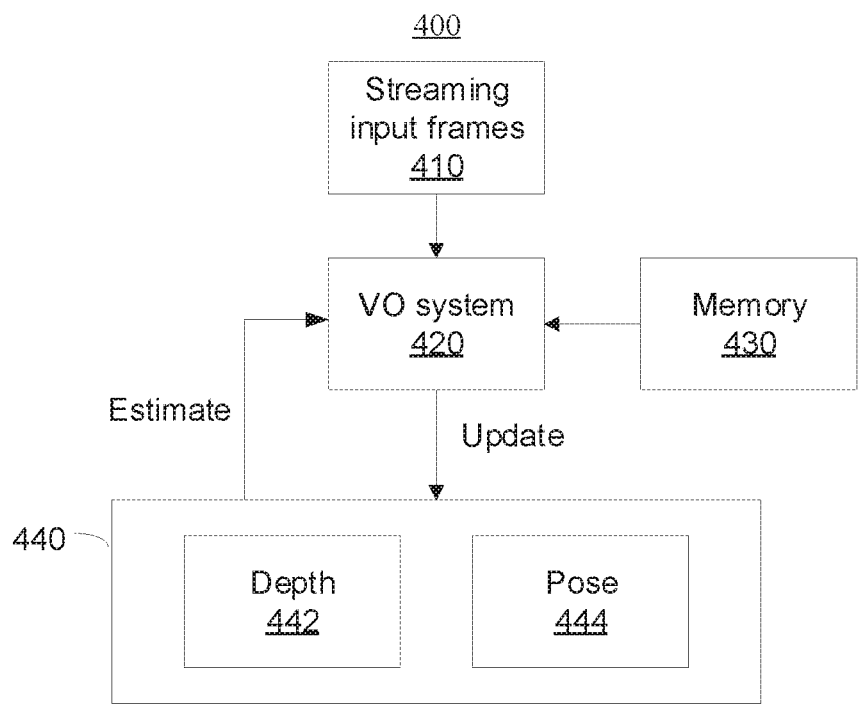
FIG. 4 is a block/flow diagram illustrating a system/method for implementing an unsupervised incremental learning strategy, in accordance with an embodiment of the present invention.

Referring now to FIG. 4, a block/flow diagram is provided illustrating an unsupervised incremental learning strategy framework 400. After the self-supervised visual odometry framework is trained, it may be deployed in an unseen environment or even in a very different domain than the training data. To facilitate online model adaptation, the framework 400 adopts an incremental learning strategy that uses self-supervised losses (e.g., photometric loss and depth smoothness loss) to continuously train the depth network and pose network. The models can thus adapt quickly to the new environment.

As shown, the framework includes streaming input frames 410 provided as input into a visual odometry (VO) system 420, a memory module 430, and networks 440 including a depth network 442 and a (camera) pose network 444.

To preserve previously learned knowledge, only the second half of the model parameters in the depth network and the pose network are updated (see, e.g., items 214, 226 and 236 described above with reference to FIG. 2), while the remaining parts are fixed. During incremental learning on new data, the unsupervised loss for short snippet as defined in equation (12) described above with reference to FIG. 1 can still be used. However, if we naively update our network in such an unsupervised incremental learning manner, the network may focus too much on its current incoming frames and forget what it has learned previously and thus not optimal for future estimations. To cope with this catastrophic forgetting phenomenon, the memory module 430 stores information from previous domains. More specifically, the memory module 430 is designed to store representative image snippets (e.g., 7 frames) from previous data domains and their corresponding pose predictions from the previously trained offline model. To select these representative pairs, the offline model can be run on previous datasets to select pairs with high photometric errors, which can provide the most stringent constraints to counter the catastrophic forgetting. Then we alternatingly train the models with new data and old data. During the training on old data, both the loss of equation (12) and an L2 loss between the pre-stored poses and newly predicted poses for corresponding image pairs can be used.

Figure 5:
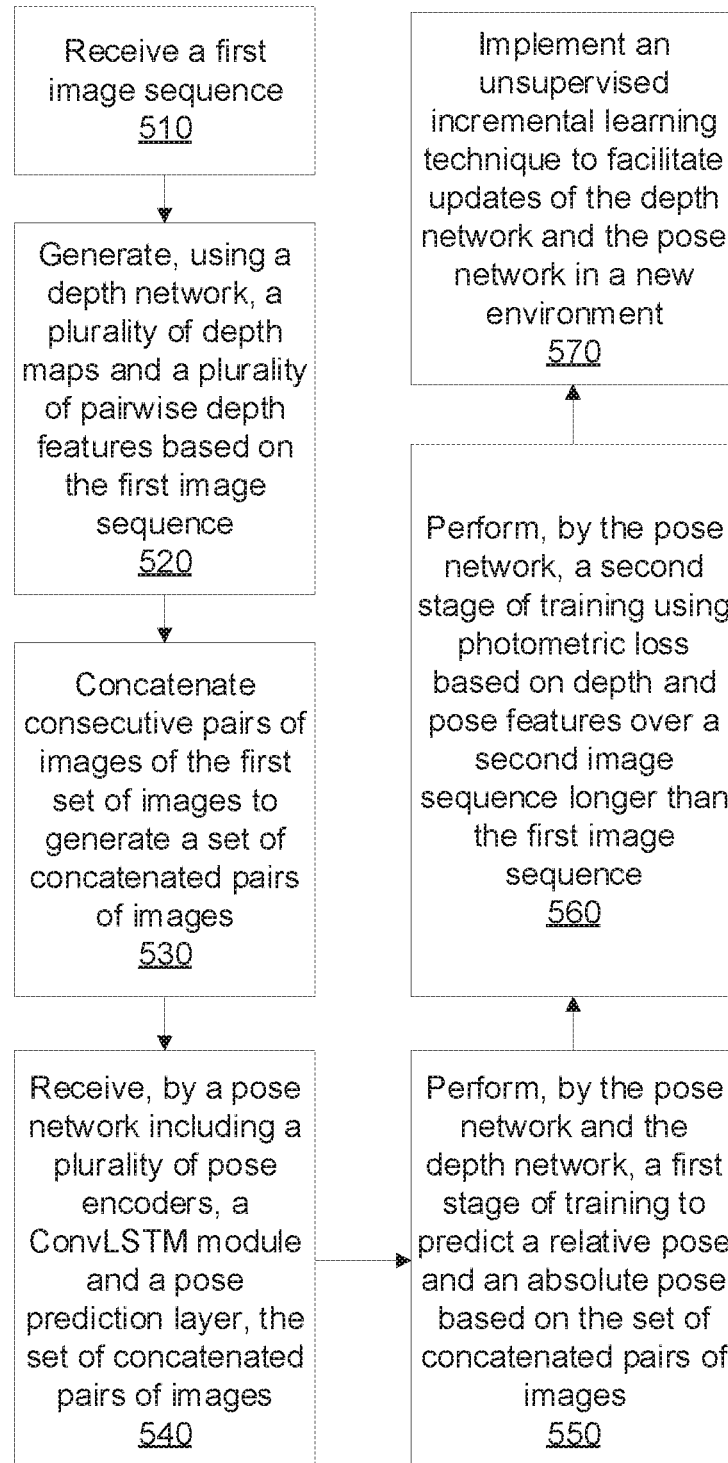
FIG. 5 is a block/flow diagram illustrating a system/method for implementing a self-supervised visual odometry learning framework using long-term modeling, in accordance with an embodiment of the present invention.

Referring now to FIG. 5, a block/flow diagram is provided illustrating a system/method 500 for implementing a self-supervised visual odometry framework using long-term modeling and incremental learning.

At block 510, a first image sequence is received. More specifically, the first image sequence can be a short image sequence having length t (e.g., having a length of 7).

At block 520, a plurality of depth maps and a plurality of pairwise depth features are generated based on the first image sequence using a depth network. More specifically, the depth network can include an autoencoder structure including a depth encoder and a depth decoder.

At block 530, consecutive pairs of images of the first image sequence are concatenated to generate a set of concatenated pairs of images. The concatenation can be performed along the channel dimension.

At block 540, the set of concatenated pairs of images are received by a pose network including a plurality of pose encoders, a convolution long short-term memory (ConvLSTM) module and a pose prediction layer. More specifically, the ConvLSTM module includes a first-layer ConvLSTM and a second-layer ConvLSTM, and the pose prediction layer is appended after each ConvLSTM.

At block 550, a first stage of training is performed by the pose network and the depth network based on the set of concatenated pairs of images. The first stage of training can use photometric loss (e.g., equations (2) and (10) described above with reference to FIG. 1), depth smoothness loss, and pose cycle consistency loss (e.g., equation (11) described above with reference to FIG. 1).

More specifically, performing the first stage of training at block 550 can include a first-layer ConvLSTM of the ConvLSTM module estimating relative pose features based on the first set of concatenated pairs of images using a first-layer ConvLSTM, and storing the relative pose features in a memory buffer. The memory buffer can be of fixed size, and the storage can help the pose prediction in a later time step. Then, performing the first stage of training at block 550 can further include a second-layer ConvLSTM of the ConvLSTM module receiving a concatenation of the relative pose features stored in the memory buffer and depth features of the first frame and the current frame. A pose prediction layer can then predict the relative pose and the absolute pose.

At block 560, a second stage of training is performed by the pose network using photometric loss based on a second image sequence. The second stage of training finetunes the second-layer ConvLSTM. Performing the second stage of training at block 560 can include pre-extracting and storing depth and pose features, and thus the second image sequence can be a long image sequence (e.g., about 100 frames). The objective/loss for the second stage of training can be represented by equation (13) described above with reference to FIG. 1

Further details regarding blocks 510-560 are described above with reference to FIGS. 1-3.

At block 570, an unsupervised incremental learning technique can be implemented to facilitate updates of the depth network and the pose network in a new environment. The unsupervised incremental learning strategy uses self-supervised losses (e.g., photometric loss, depth smoothness loss, and pose cycle consistency loss) to continuously train the depth network and pose network. Old data (e.g., images and poses) can be periodically revisited to train the models in order not to forget previously learned features and knowledge. Since only a half part of the models are trained, the models can adapt quickly to the new environment. Further details regarding block 570 are described above with reference to FIG. 4.

Figure 6:
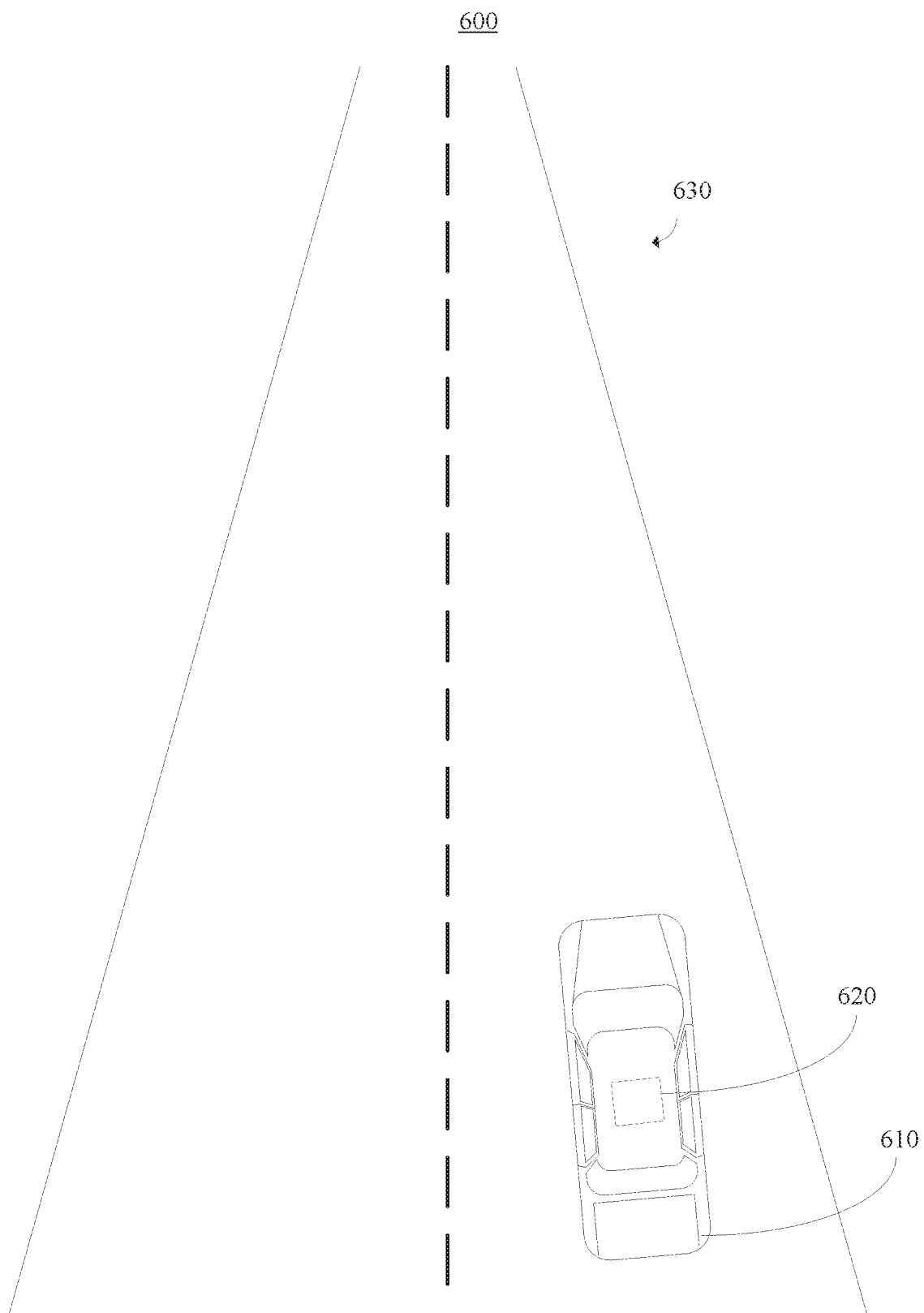
FIG. 6 is a diagram illustrating an exemplary usecase for implementing a self-supervised visual odometry learning framework using long-term modeling, in accordance with an embodiment of the present invention.

Referring now to FIG. 6, a diagram is provided illustrating a high-level overview of an exemplary system 600. More specifically, the system 600 includes an autonomous driving system. As shown, the system 600 includes a vehicle 610. In this illustrative embodiment, the vehicle 610 is depicted as a car. However, the vehicle 610 can be any suitable vehicle in accordance with the embodiments described herein.

As further shown, an image capturing device 620 can be positioned about the vehicle 110. In one embodiment, the image capturing device 620 includes a camera (e.g., monocular camera setup). As shown in this illustrative embodiment, the image capturing device 120 is mounted on the roof of the vehicle 610. However, the image capturing device 620 can be positioned in any suitable location on or inside of the vehicle 610, in accordance with the embodiments described herein.

The image capturing device 620 is configured to obtain still images and/or a video sequence associated with a perspective view of a scene 630. For example, the image capturing device 620 can be configured to capture red-green-blue (RGB) images of the scene. Additionally, although the scene 630 in FIG. 1 shows an empty road, the scene 630 can be any suitable driving scene in accordance with the embodiments described herein. Examples of such driving scenes can include, but are not limited to, highways, urban areas with complex intersections, etc. Moreover, foreground scene objects or elements of the scene 630 can include, but are not limited to, other cars, pedestrians, traffic signs, poles, etc.

The system 600 can be configured to implement self-supervised visual odometry frameworks using long-term modeling, as described herein above with reference to FIGS. 1-5. Although the illustrative embodiment of FIG. 6 is described within the context of autonomous driving, the embodiments described herein can be applied to any system capable of implementing self-supervised visual odometry frameworks using long-term modeling. Examples of other system capable of self-supervised visual odometry frameworks using long-term modeling include, but are not limited to, robot navigation and virtual/augmented reality.

Figure 7:
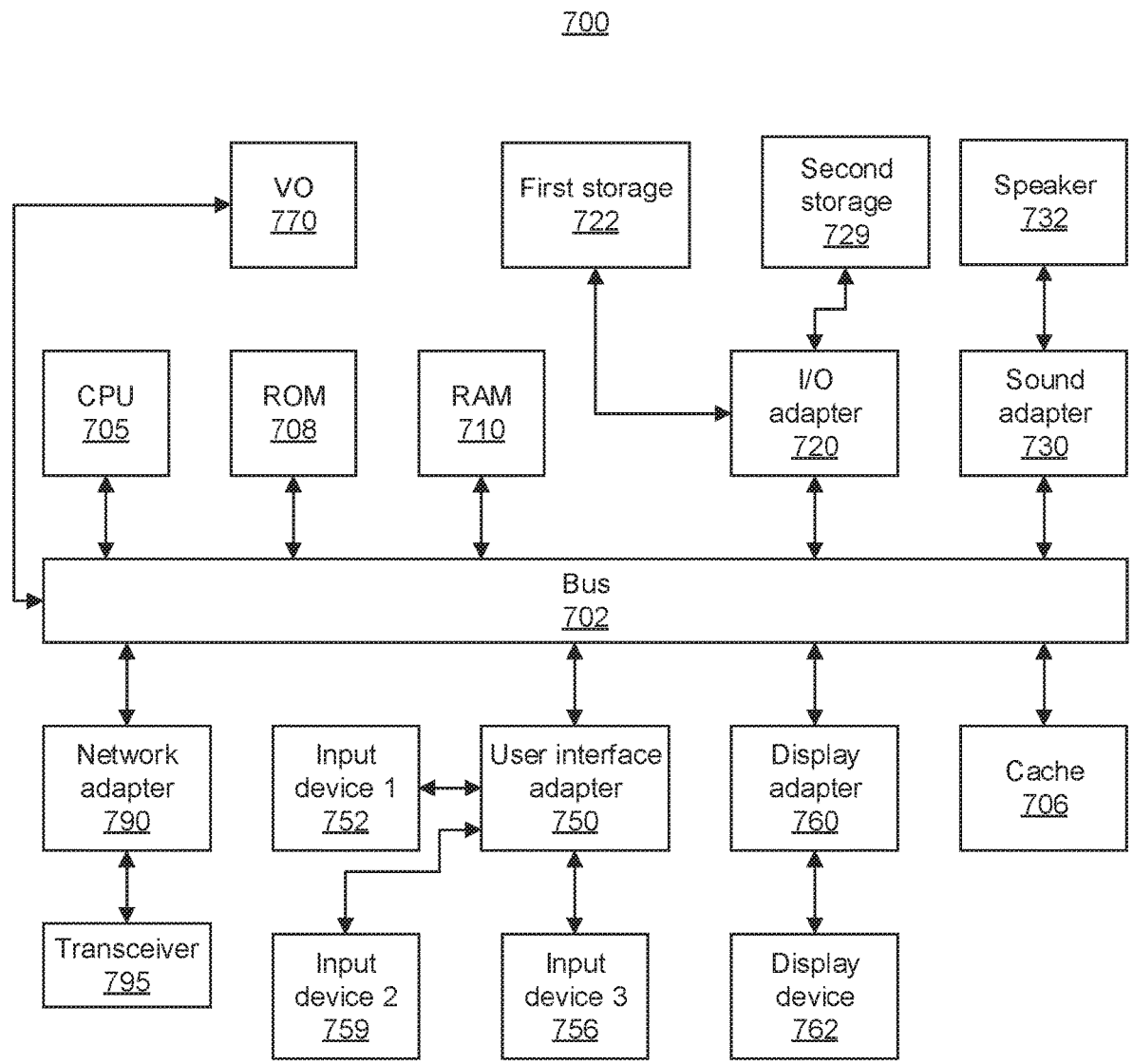
FIG. 7 is a block/flow diagram illustrating a computer system, in accordance with an embodiment the present invention.

Referring now to FIG. 7, an exemplary computer system 700 is shown which may represent a server or a network device, in accordance with an embodiment of the present invention. The computer system 700 includes at least one processor (CPU) 705 operatively coupled to other components via a system bus 702. A cache 706, a Read Only Memory (ROM) 708, a Random-Access Memory (RAM) 710, an input/output (I/O) adapter 720, a sound adapter 730, a network adapter 790, a user interface adapter 750, and a display adapter 760, are operatively coupled to the system bus 702.

A first storage device 722 and a second storage device 729 are operatively coupled to system bus 702 by the I/O adapter 720. The storage devices 722 and 729 can be any of a disk storage device (e.g., a magnetic or optical disk storage device), a solid state magnetic device, and so forth. The storage devices 722 and 729 can be the same type of storage device or different types of storage devices.

A speaker 732 may be operatively coupled to system bus 702 by the sound adapter 730. A transceiver 795 is operatively coupled to system bus 702 by network adapter 790. A display device 762 is operatively coupled to system bus 702 by display adapter 760.

A first user input device 752, a second user input device 759, and a third user input device 756 are operatively coupled to system bus 702 by user interface adapter 750. The user input devices 752, 759, and 756 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 752, 759, and 756 can be the same type of user input device or different types of user input devices. The user input devices 752, 759, and 756 are used to input and output information to and from system 700.

Visual odometry (VO) component 770 may be operatively coupled to system bus 702. VO component 770 is configured to perform one or more of the operations described above. VO component 770 can be implemented as a standalone special purpose hardware device, or may be implemented as software stored on a storage device. In the embodiment in which VO component 770 is software-implemented, although shown as a separate component of the computer system 700, VO component 770 can be stored on, e.g., the first storage device 722 and/or the second storage device 729. Alternatively, VO component 770 can be stored on a separate storage device (not shown).

Of course, the computer system 700 may also include other elements (not shown), as readily contemplated by one of skill in the art, as well as omit certain elements. For example, various other input devices and/or output devices can be included in computer system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 700 are readily contemplated by one of ordinary skill in the art given the teachings of the present invention provided herein.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for implementing a self-supervised visual odometry framework using long-term modeling, comprising:
   within a pose network of the self-supervised visual odometry framework including a plurality of pose encoders, a convolution long short-term memory (ConvLSTM) module having a first-layer ConvLSTM and a second-layer ConvLSTM, and a pose prediction layer:
      performing a first stage of training over a first image sequence using photometric loss, depth smoothness loss and pose cycle consistency loss, including:
         generating, by each of a plurality of components of the first-layer ConvLSTM, a corresponding pose feature based on the first image sequence;
         receiving, by each component of the second layer ConvLSTM, a concatenation of the pose features and depth features of a first frame and a current frame, the depth features being generated by a depth network of the self-supervised visual odometry framework; and
         predicting, by the pose prediction layer, a relative pose and an absolute pose based on the concatenation of the pose features and the depth features; and
      performing a second stage of training over a second image sequence longer than the first image sequence to finetune the second-layer ConvLSTM.

2. The method as recited in claim 1, further comprising generating, using a depth network of the self-supervised visual odometry framework, a plurality of depth maps and a plurality of pairwise depth features based on the first image sequence.

3. The method as recited in claim 1, further comprising:
   receiving the first image sequence; and
   concatenating consecutive pairs of images of the first image sequence to generate a set of concatenated pairs of images;
   wherein the first stage of training is performed based on the set of concatenated pairs of images.

4. The method as recited in claim 1, wherein performing the first stage of training further includes storing each pose feature in a memory buffer after generating each pose feature.

5. The method as recited in claim 1, wherein performing the second stage of training further includes pre-extracting the depth features and the pose features, and finetuning the second-layer ConvLSTM using the photometric loss over the second image sequence.

6. The method as recited in claim 1, further comprising implementing an unsupervised incremental learning technique to facilitate updates of the depth network and the pose network in a new environment.

7. The method as recited in claim 6, wherein the unsupervised incremental learning strategy uses self-supervised losses including photometric loss, depth smoothness loss, and pose cycle consistency loss to continuously train the depth network and the pose network.

8. A computer program product comprising a non-transitory computer readable storage medium having program instructions embodied therewith, the program instructions executable by a computer to cause the computer to perform a method for implementing a self-supervised visual odometry framework using long-term modeling, the method performed by the computer comprising:
within a pose network of the self-supervised visual odometry framework including a plurality of pose encoders, a convolution long short-term memory (ConvLSTM) module having a first-layer ConvLSTM and a second-layer ConvLSTM, and a pose prediction layer:
performing a first stage of training over a first image sequence using photometric loss, depth smoothness loss and pose cycle consistency loss, including:
generating, by each of a plurality of components of the first-layer ConvLSTM, a corresponding pose feature based on the first image sequence;
receiving, by each component of the second layer ConvLSTM, a concatenation of the pose features and depth features of a first frame and a current frame, the depth features being generated by a depth network of the self-supervised visual odometry framework; and
predicting, by the pose prediction layer, a relative pose and an absolute pose based on the concatenation of the pose features and the depth features; and
performing a second stage of training over a second image sequence longer than the first image sequence to finetune the second-layer ConvLSTM.

9. The computer program product as recited in claim 8, wherein the method further includes:
receiving the first image sequence; and
concatenating consecutive pairs of images of the first image sequence to generate a set of concatenated pairs of images;
wherein the first stage of training is performed based on the set of concatenated pairs of images.

10. The computer program product as recited in claim 8, wherein performing the first stage of training further includes storing each pose feature in a memory buffer after generating each pose feature.

11. The computer program product as recited in claim 8, wherein the method further includes performing a first stage of training using photometric loss, depth smoothness loss and pose cycle consistency loss.

12. The computer program product as recited in claim 8, wherein performing the second stage of training further includes pre-extracting the depth features and the pose features, and finetuning the second-layer ConvLSTM using the photometric loss over the second image sequence.

13. The computer program product as recited in claim 8, further comprising implementing an unsupervised incremental learning technique to facilitate updates of the depth network and the pose network in a new environment.

14. The computer program product as recited in claim 13, wherein the unsupervised incremental learning strategy uses self-supervised losses including photometric loss, depth smoothness loss, and pose cycle consistency loss to continuously train the depth network and the pose network.

15. A system for implementing a self-supervised visual odometry framework using long-term modeling, comprising:
a memory device storing program code; and
at least one processor device operatively coupled to the memory device and configured to execute program code stored on the memory device to:
within a pose network of the self-supervised visual odometry framework including a plurality of pose encoders, a convolution long short-term memory (ConvLSTM) module having a first-layer ConvLSTM and a second-layer ConvLSTM, and a pose prediction layer:
within a pose network of the self-supervised visual odometry framework including a plurality of pose encoders, a convolution long short-term memory (ConvLSTM) module having a first-layer ConvLSTM and a second-layer ConvLSTM, and a pose prediction layer:
perform a first stage of training over a first image sequence using photometric loss, depth smoothness loss and pose cycle consistency loss by:
generating, by each of a plurality of components of the first-layer ConvLSTM, a corresponding pose feature based on the first image sequence;
receiving, by each component of the second layer ConvLSTM, a concatenation of the pose features and depth features of a first frame and a current frame, the depth features being generated by a depth network of the self-supervised visual odometry framework; and
predicting, by the pose prediction layer, a relative pose and an absolute pose based on the concatenation of the pose features and the depth features; and
perform a second stage of training over a second image sequence longer than the first image sequence to finetune the second-layer ConvLSTM.

16. The system as recited in claim 15, wherein the at least one processor device is further configured to execute program code stored on the memory device to generate, using a depth network of the self-supervised visual odometry framework, a plurality of depth maps and a plurality of pairwise depth features based on the first image sequence.

17. The system as recited in claim 15, wherein the at least one processor device is further configured to execute program code stored on the memory device to:
receive the first image sequence; and
concatenate consecutive pairs of images of the first image sequence to generate a set of concatenated pairs of images;
wherein the first stage of training is performed based on the set of concatenated pairs of images.

18. The system as recited in claim 15, wherein the at least one processor device is further configured to execute program code stored on the memory device to store each pose feature in a memory buffer after generating each pose feature.

19. The system as recited in claim 18, wherein the at least one processor device is further configured to execute program code stored on the memory device to perform the second stage of training by pre-extracting the depth features and the pose features, and finetuning the second-layer ConvLSTM using the photometric loss over the second image sequence.

20. The system as recited in claim 15, wherein the at least one processor device is further configured to execute program code stored on the memory device to implement an unsupervised incremental learning technique to facilitate updates of the depth network and the pose network in a new environment, wherein the unsupervised incremental learning strategy uses self-supervised losses including photometric loss, depth smoothness loss, and pose cycle consistency loss to continuously train the depth network and the pose network.

* * * * *